(12) United States Patent
Guillemette et al.

(10) Patent No.: US 10,946,609 B2
(45) Date of Patent: Mar. 16, 2021

(54) EXTRUSION WRAPPING DEFLECTOR (71) Applicant: Guill Tool & Engineering Co., inc., West Warwick, RI (US)

(72) Inventors: Richard Guillemette, West Warwick, RI (US); Robert Peters, West Warwick, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 0 days.

(21) Appl. No.: 16/550,813

(22) Filed: Aug. 26, 2019

(65) Prior Publication Data

US 2020/0108581 A1    Apr. 9, 2020

Related U.S. Application Data

(63) Continuation of application No. 14/547,343, filed on Nov. 19, 2014, now Pat. No. 10,399,294.

(60) Provisional application No. 61/906,203, filed on Nov. 19, 2013.

(51) Int. Cl.

| | | |
|---|---|---|
| *B29C 48/335* | (2019.01) | |
| *B32B 1/08* | (2006.01) | |
| *B32B 5/02* | (2006.01) | |
| *B32B 27/08* | (2006.01) | |
| *B32B 27/20* | (2006.01) | |
| *B32B 27/28* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 27/38* | (2006.01) | |
| *B32B 27/40* | (2006.01) | |
| *B29C 48/06* | (2019.01) | |

(Continued)

(52) U.S. Cl.
CPC ............... *B32B 1/08* (2013.01); *B29C 48/06* (2019.02); *B29C 48/336* (2019.02); *B32B 5/022* (2013.01); *B32B 27/08* (2013.01); *B32B 27/20* (2013.01); *B32B 27/281* (2013.01); *B32B 27/286* (2013.01); *B32B 27/30* (2013.01); *B32B 27/32* (2013.01); *B32B 27/322* (2013.01); *B32B 27/34* (2013.01); *B32B 27/36* (2013.01); *B32B 27/365* (2013.01); *B32B 27/38* (2013.01); *B32B 27/40* (2013.01); *B29C 48/09* (2019.02); *B29K 2101/12* (2013.01); *B32B 2262/106* (2013.01); *B32B 2535/00* (2013.01); *Y10T 428/13* (2015.01); *Y10T 428/31504* (2015.04)

(58) Field of Classification Search
None
See application file for complete search history.

(56) References Cited

U.S. PATENT DOCUMENTS

5,538,411 A * 7/1996 Gates .................... B29C 48/30
425/133.1
6,533,565 B1   3/2003 Guillemette
6,669,458 B2   12/2003 Guillemette et al.
(Continued)

*Primary Examiner* — Monica A Huson
*Assistant Examiner* — Kelsey C Grace
(74) *Attorney, Agent, or Firm* — Ziegler IP Law Group, LLC (57) ABSTRACT

A method for wrapping a stream of material or stream of layers of materials includes feeding a stream of material or stream of layers of materials into a die containing a wrapping deflector which acts to wrap the stream into a tubular or profile shape.

16 Claims, 8 Drawing Sheets

(51) Int. Cl.
    *B29K 101/12*     (2006.01)
    *B29C 48/09*     (2019.01)

(56) References Cited

U.S. PATENT DOCUMENTS

| | | |
|---|---|---|
| 6,945,764 B2 | 9/2005 | Guillemette |
| 7,690,908 B2 | 4/2010 | Guillemette et al. |
| 2012/0189789 A1 | 7/2012 | Langlais et al. |

\* cited by examiner

EXTRUSION WRAPPING DEFLECTOR

FIELD

The present disclosure generally relates to extrusion die systems. In particular, the present disclosure relates to wrapping tubular extrusion of one or more stream(s) to generate new geometries. The products of these wrapped streams and layers may contain small sized grain features, in the range of mili, micro and nanosized grain features, in a tubular or profile shape.

BACKGROUND OF THE INVENTION

Extrusion technologies are well known in the art including those methods described in U.S. Pat. Nos. 6,669,458, 6,533,565 and 6,945,764, and are commonly owned by the assignee of the instant application. Micro-layer extrusion processes are specialized extrusion methods that provide products with small grain features such as described in U.S. Pat. No. 7,690,908, (hereinafter the "'908 patent") and U.S. Patent Publication 2012/0189789 (hereinafter the "'789 Publication") both of which are commonly owned by the assignee of the instant application, the disclosures of which are incorporated herein by reference in their entirety.

Typical micro-layer products are formed in a sheet. If a tubular product is desired, the microlayer is first extruded as a sheet and then made into the tube. This creates a weld line or separation between the microlayers. The '908 patent describes a cyclical extrusion of materials by dividing, overlapping and laminating layers of flowing material, multiplying the flow and further dividing, overlapping and laminating the material flow to generate small grain features and improve properties of the formed product. The '789 Publication describes extruding a flow of extrusion material in a non-rotating extrusion assembly, forming a first set of multiple laminated flow streams from the extruded flow, amplifying a number of the laminations by repeatedly compressing, dividing and overlapping the multiple laminated flow streams, rejoining the parallel amplified laminated flows, forming a first combined laminate output with micro/nano-sized features from the rejoining; and forming a tubular shaped micro-layer product from the combined laminate output. There is still a great need for new extrusion geometries.

SUMMARY OF THE INVENTION

The purpose of this invention is to provide a unique distribution groove for a balanced flow passage used to disperse the molten plastic in an extrusion die evenly within a tubular or profile extrusion channel. This distribution groove may also serve to multiply layers contained in a stream of molten plastic. Die systems, employing balanced flow distribution grooves, are constructed by assembling a series of cylindrical components along a common axis. A continuous flow passage is formed by the cooperation of the adjacent components. Additionally, this invention is directed to new components which have multiple applications and facilitate the replacement of certain parts of the passage to provide different functions.

A deflector is a component, which in conjunction with a tip and/or other deflectors, acts to perform the shaping of the molten plastic. The molten plastic would then proceed through the extrusion head in its newly formed shape. After any compression or other shape modifications the plastic will eventually exit in the desired product shape.

According to the invention, a stream of material or stream of layers of materials may be fed into a die containing a 'wrapping' deflector which will act to wrap the stream into a tubular or profile shape. These deflectors may rely on material flowing in a groove(s) while bleeding through a slit or 'dam' to wrap material any number of times into a desired shape. The dam can be modified by changing the length and/or thickness which determines how easily a fluid will flow through. The size of the groove can also be modified. By changing these characteristics a balanced flow can be achieved. In general, the deflectors work by making flow in the wrapping direction less torturous than the direction of extrusion.

These deflectors have many benefits over other known deflectors. Deflectors which form a tubular shape normally function by merging material end to end to create a loop. Often a tubular product will burst where molten plastic was fused at a seam which would run straight through the thickness of the product. Wrapping deflectors act to wind this seam around the tube as it goes through the thickness of the product. A winded seam will result in increased burst strength as the seam is now a much more torturous path to split along. Another advantage of these deflector designs is that if a correctly oriented stream of layers is being wrapped, every full revolution the material is wrapped will act to multiply the number of layers through the thickness of the tube (or individual layer of the tube).

These multilayered/multi-component streams comprise so-called plastics including but not limited to polyethylenes, polypropylenes, polystyrenes, polyvinyl chlorides, polytetrafluoroethylenes (PTFE), polysulfones, polyphenylene oxides, polybutylene terephthalates, polyvinylidene chlorides, polyethylene terephthalates, polystyrenes, polycyclohexane diethylene terephthalates, styrene-butadiene-acrylonitrile copolymer, polybutylene naphthalates, nylons such as nylon 11, nylon 12, polyimides, polyamides, polycarbonates, polyurethanes, polyacetals, polyether amides, polymethylmethacrylates, epoxies and polyester amides. Any other plastic or material used in this manner is considered an apparent extension of this invention.

Products made by these methods may have thousands of layers. Certain embodiments have 1-10 layers. Other embodiments have 10-100 layers. Yet other embodiments have 100-1000 layers and yet other embodiments have 1000 to 100,000 even 1,000,000 layers.

Another embodiment of the invention relates to products containing filler particles or fibers. Certain products contain filler particles or fibers aligned along the extrusion axis.

Another embodiment relates to products wherein the fibers are carbon fibers, more specifically carbon nanotubules.

Fibers include single fibers or a myriad of other arrangements. Some exemplary arrangements include but are not limited to yarns, a tow of fibers or yarns, a weave, a nonwoven, chopped fiber, a chopped fiber mat (with random or ordered formats), or combinations of these formats. The chopped fiber mat or nonwoven may be stretched, stressed, or oriented to provide some alignment of the fibers within the nonwoven or chopped fiber mat, rather than having a random arrangement of fibers.

Fibers alignment can also be tailored by the application of external forces such as magnetic fields.

Another embodiment of the present invention relates to extruded multilayer wrapped medical devices comprising one or more pharmaceutical product(s) or drug substances (including mixtures thereof) layered with one or more biocompatible materials that control the time release of the delivery of the drug substance.

Medical devices include but are not limited to catheters, stents, threads, cables (including fiber optic cables), pills, capsules, lozenges, tablets, implants, medical tubing, sheaths, clamps, sutures, tapes, sheets and endotracheal devices.

Another embodiment of the invention relates to a wrapped medical tubular device comprising: a polymeric tube containing small sized grains, nano or micro-sized features and a drug substance.

Another embodiment of the present invention is directed to extrusion products possessing electrical properties. More specifically, these extrusion products contain multilayers wherein one or more layers contain electrical conducting materials and more specifically milli, micro or nanoparticle electrical conducting materials. An extrudable metal could be used as a material to form conductive layers. Such metals could also be used with compatible plastics to form insulated layers or pathways. Aspects of the disclosed embodiments are also directed to creating and producing nanoparticle products using multilayers/multistreams (and also optionally wherein the layer may be in the milli, micro or nano dimension) to enhance the electrical properties of the products. In one embodiment, each layer may be comprised of one or more elements that facilitate one or more of the layers to conduct electricity.

One specific embodiment relates to an extruded multilayer polymer product comprising one or more layers possessing electrical properties. A more specific embodiment relates to a product wherein said one or more layers are milli, micro or nano size, wherein said one or more layers contain nanoparticle electrical conducting materials. More specifically wherein said product wherein said one or more electrical conducting layers are layered between nonconducting layers.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

FIG. 2 depicts examples of products made by a deflector. FIG. 2(a) depicts a product with the seam winding around and through the product whereas

FIGS. 10 (a) and 10 (b) offer two more example variations of a wrapping deflector.

DETAILED DESCRIPTION OF THE INVENTION

Figure 1:
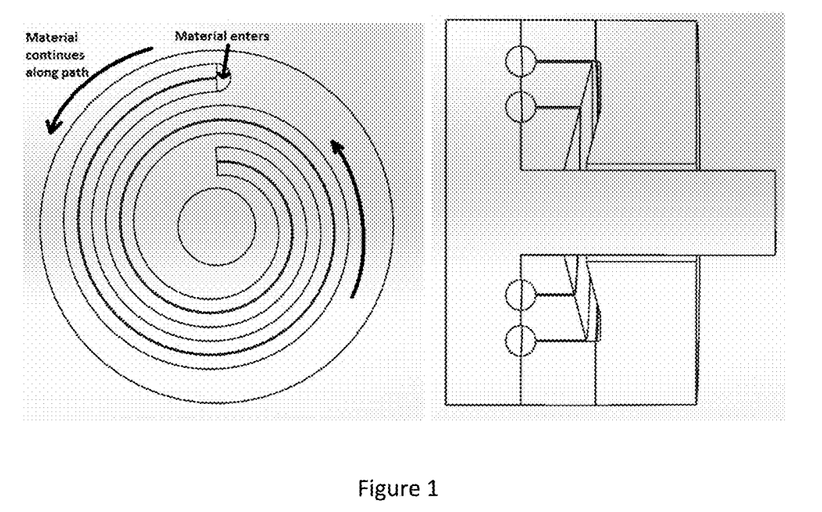
FIG. 1 depicts an example of a wrapping deflector.

An example wrapping deflector is shown above in FIG. 1. In this example, a stream of material will travel spirally inwards while slowly flowing through the dam. The dam here is slowly getting shorter as the material makes its way through the groove. The shorter dam allows the material to flow through it easier which will help to form an even flow over different portions of the dam. While this example is spiraling inwards, it could also be made to spiral outwards.

Figure 2A:
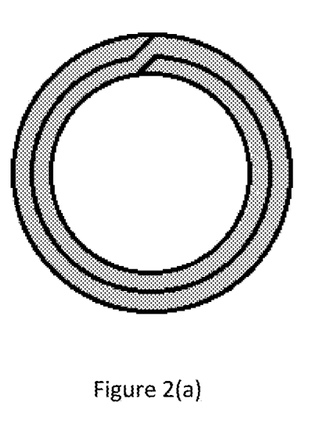
Figure 2B:
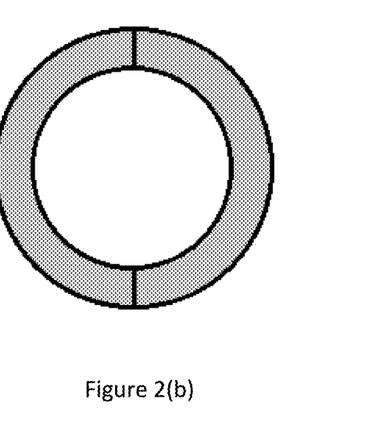
FIG. 2(b) depicts a product with seams straight through the product.

An example product made by such a deflector which shows the seam winding around and through the product (FIG. 2(a)) next to a product with seams straight through the product (FIG. 2(b)).

Figure 3:
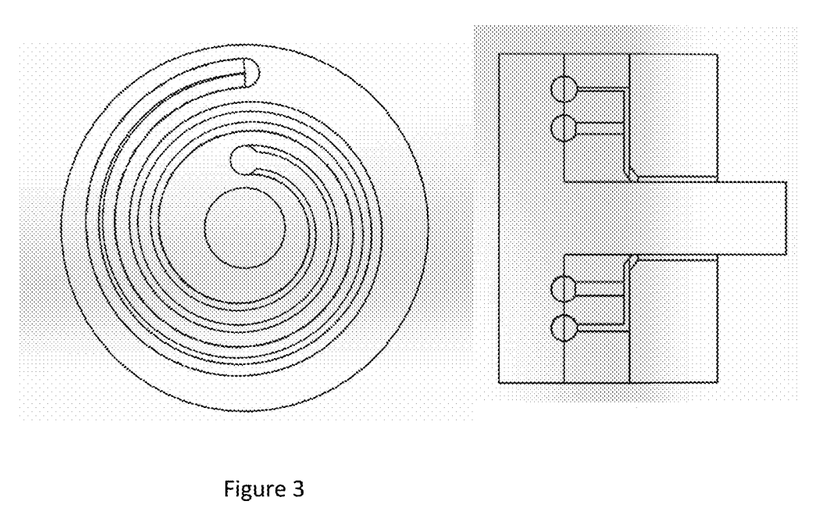
FIG. 3 illustrates a wrapping deflector.

FIG. 3 illustrates a wrapping deflector where the dam is widened as opposed to shortened in order to promote even flow along the length of the dam. The dam could also be located below the groove heading toward the central axis before turning into a section similar to what is now the dam.

Figure 4:
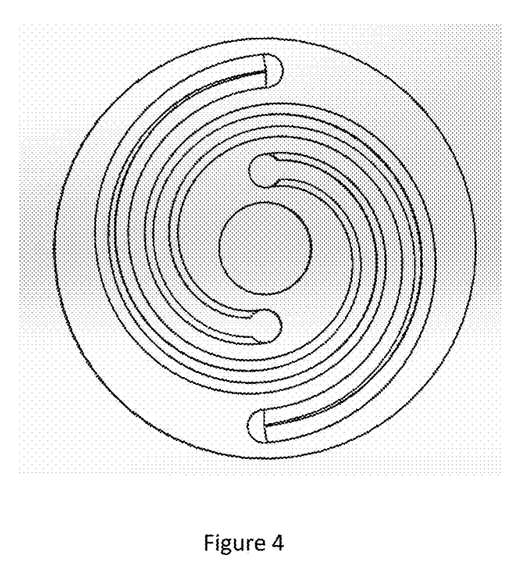
FIG. 4 depicts the example where there are two grooves intertwined with each groove wrapping around once.

Multiple grooves could also be spirally nested within each other. These grooves could hold the same materials or different materials. In FIG. 4, there are two grooves intertwined with each groove wrapping around once. Different numbers and lengths could be used to create a variety of shapes.

Figure 5:
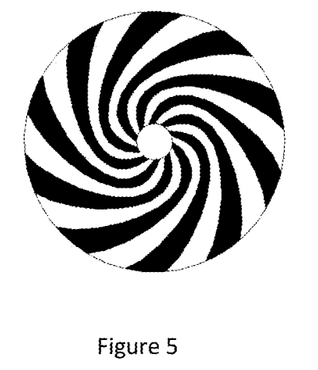
FIG. 5 illustrates a product cross section made with many feeds and nested grooves with only minimal wrapping.

FIG. 5 illustrates a product cross section made with many feeds and nested grooves with only minimal wrapping.

The grooves in a deflector could also take other forms than simple spirals. The grooves could form bends or wrap in areas besides the central axis.

Figure 6:
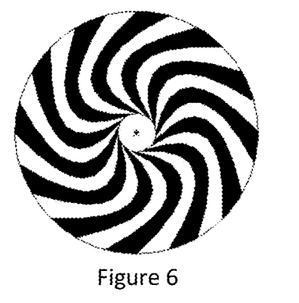
FIG. 6 illustrates a product produced wherein the grooves start to wrap but are then bent back to the original starting angle as they head radially inwards.

FIG. 6 illustrates a product produced wherein the grooves start to wrap but are then bent back to the original starting angle as they head radially inwards.

Figure 7A:
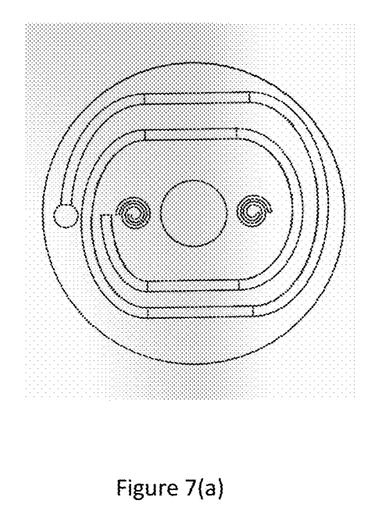
FIG. 7(a) illustrates a deflector with grooves which could make a product of FIG. 7(b) wherein three input streams in which two are imbedded in the third.
Figure 7B:
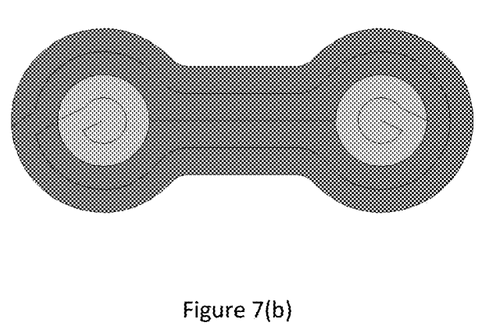

A deflector with grooves following the paths shown in FIG. 7(a) could make a product similar to FIG. 7(b). This example takes three input streams with two being imbedded in the third.

Figure 8A:
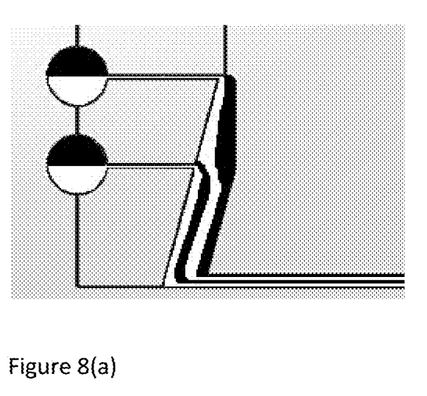
FIGS. 8(a) and (b) demonstrate how materials flowing through deflectors cascade over themselves to form multiple layers.
Figure 8B:
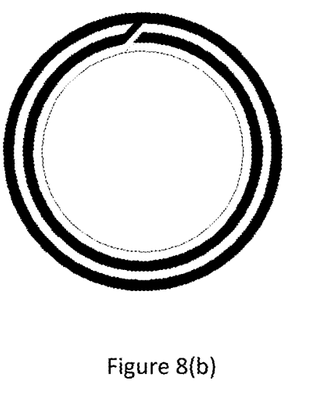
Figure 9A:
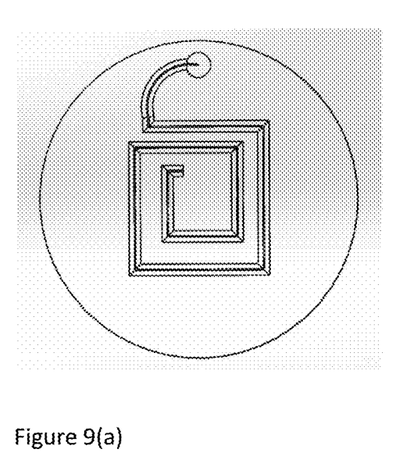
FIGS. 9(a) and (b) illustrate another variation of how materials flow through deflectors to form multiple layers.
Figure 9B:
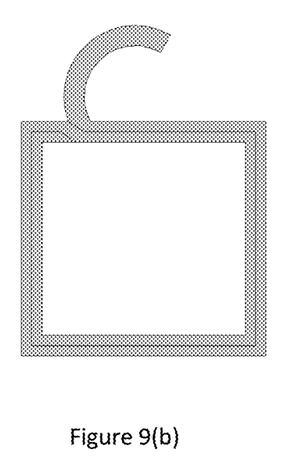

FIGS. 8(a) and (b) demonstrate how materials flowing through these deflectors cascade over themselves to form multiple layers. In this example the input stream is multilayered and wraps to form a four layer tube. The number of layers in input streams could be from one to thousands and could also take a multi-component approach with multiple cross sections merged together.

Profile shapes could be formed by drawing in the shape with the groove and maintaining separation of appendages or holes as the shape compresses to its final size and shape. In some cases certain areas of the dam could be tightened or opened to change the amount of material in different parts of the cross section. Some parts of the dam could also be blocked off completely.

Figure 10A:
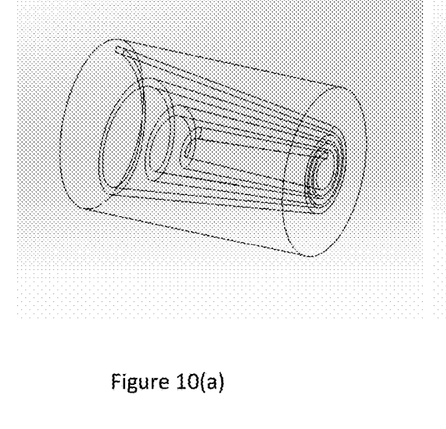
Figure 10B:
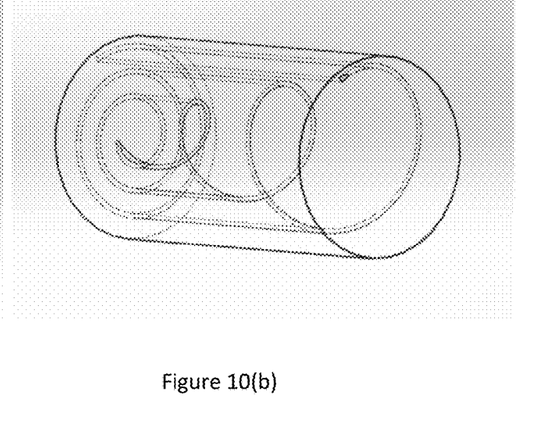

FIGS. 10 (a) and 10 (b) offer two more example variations of a wrapping deflector. Rather than relying on a groove and dam to balance the flow of the material, the flow path moves forward while the material is wrapping to allow for the flow to expand in that direction. The flow path could also widen along this process as seen FIG. 10a to encourage the wrapping. The deflectors shown above maintain the separation while wrapping the materials. In subsequent sections of the extrusion die, the material will merge onto itself to form the desired tubular shape.

Figure 11:
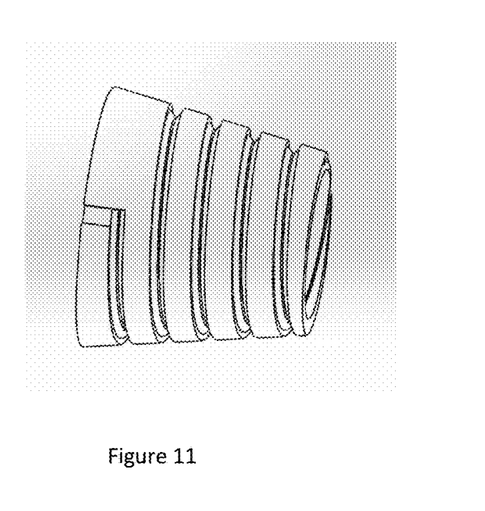
FIG. 11 illustrates the path of the grooves.

FIG. 11 illustrates the path of the grooves.

Figure 12:
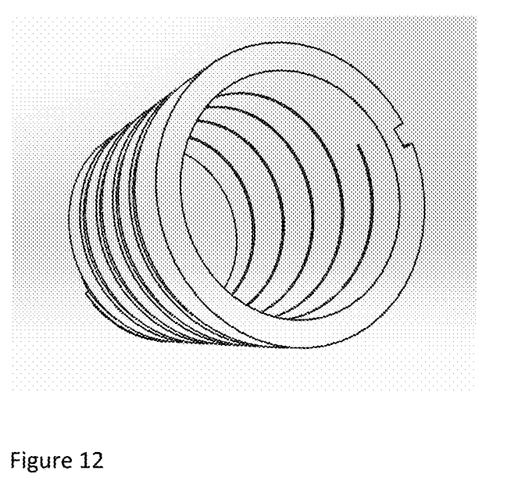
FIG. 12 illustrates a dam cut on the inside diameter of the deflector.

FIG. 12 illustrates a dam cut on the inside diameter of the deflector.

Figure 13:
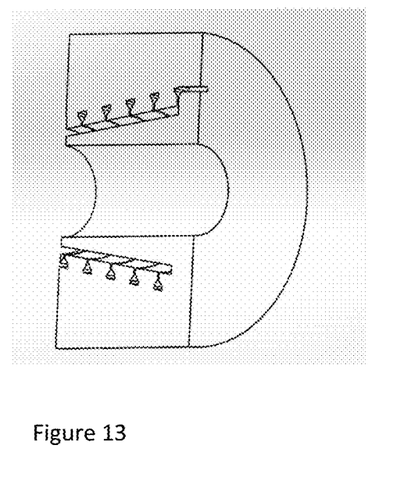
FIG. 13 illustrates how a deflector could be integrated with a tip component.

FIG. 13 illustrates how a deflector would be integrated with a tip component. In this embodiment, flow continues forwards in a groove while wrapping and spilling over a dam. Each wrap would act to add another layer to the annular stream being formed below.

Deflectors shown thus far are spirally wrapping shapes but they could also take stepped approaches to perform the wrapping. Such stepped approaches could include forming a nearly closed ring for each step. Instead of merging back the beginning of its own ring (or another ring if there were nested streams), there would be a change in direction to start another ring. The change in direction would depend on the deflector style.

A stepped approach of the most recent style could consist of a series of plates with grooves forming individual near-rings which would transition to the next plate at the end of the ring.

Figure 14:
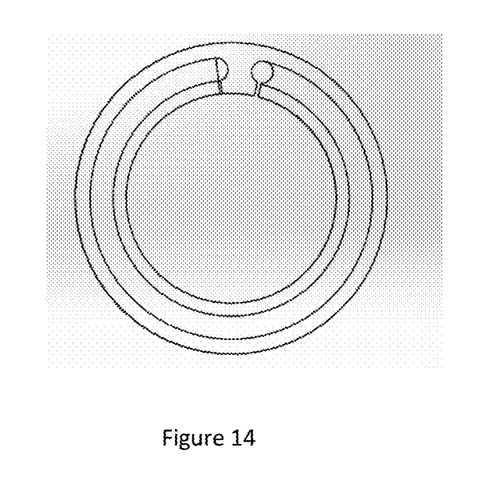
FIG. 14 illustrates a plate with a near-ring groove.

FIG. 14 illustrates a plate with a near-ring groove. The dam acts to create flow radially inwards. The groove starts on the top left and continues until the path through the plate on the top right. This path, which could be angled, could then lead to the start of another ring which would create the wrapping effect in the product.

Figure 15:
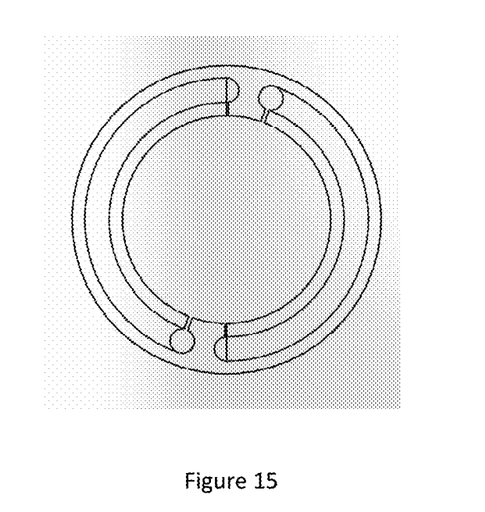
FIG. 15 illustrates a deflector which would produce nested wrapping when used in an assembly of multiple plates.

FIG. 15 illustrates a deflector which would produce nested wrapping when used in an assembly of multiple plates. This plate would take two input streams.

Figure 16:
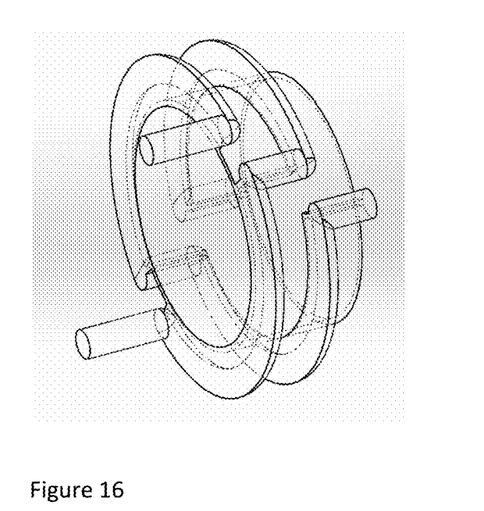
FIG. 16 illustrates how material flowing through two stacked deflectors would look.

FIG. 16 illustrates how material flowing through two stacked deflectors would look.

Figure 17:
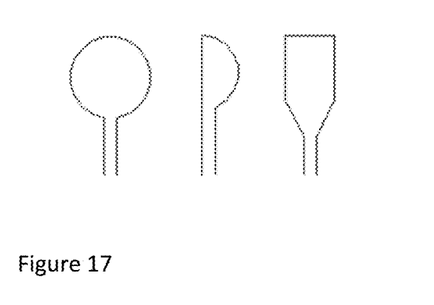
FIG. 17 illustrates several groove profiles.

The grooves in wrapping deflectors could be any shape. Many of the examples shown in the figures are round or circular grooves. FIG. 17 illustrates several groove profiles.

These wrapping deflectors could be used to create products consisting of multiple layers with each layer being made by its own deflector or multiple materials could be used on the same deflector with separate grooves. A layer in this sense is distinct from sub layers in a stream of input material.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit or scope of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A product comprising a wrapped stream of material or wrapped stream of layers of materials deposited evenly along a tubular or profile shape, wherein the product does not include a weld line, the wrapped stream of layers of materials includes 2-12 layers and the wrapped stream of layers of materials includes one or more of said layers in the micrometer thickness range.

2. The product according to claim 1 wherein multiple streams of the wrapped stream of material or wrapped stream of layers of materials are spirally nested within each other.

3. A product comprising a wrapped stream of material or wrapped stream of layers of materials deposited evenly along a tubular or profile shape, wherein the product does not include a weld line, the wrapped stream of layer of materials includes 2-12 layers and the wrapped stream of layers of materials includes one or more of said layers in the nanometer thickness range.

4. The product according to claim 3 wherein multiple streams of the wrapped stream of material or wrapped stream of layers of materials are spirally nested within each other.

5. A product comprising a wrapped stream of material or wrapped stream of layers of materials deposited evenly along a tubular or profile shape, wherein the product does not include a weld line, wherein the wrapped stream of layers of materials includes 10-1000 layers.

6. The product according to claim 5 wherein multiple streams of the wrapped stream of material or wrapped stream of layers of materials are spirally nested within each other.

7. The product according to claim 5 wherein the wrapped stream of layers of materials includes one or more of said layers in the micrometer thickness range.

8. The product according to claim 7 wherein multiple streams of the wrapped stream of material or wrapped stream of layers of materials are spirally nested within each other.

9. The product according to claim 5 wherein the wrapped stream of layers of materials includes one or more of said layers in the nanometer thickness range.

10. The product according to claim 9 wherein multiple streams of the wrapped stream of material or wrapped stream of layers of materials are spirally nested within each other.

11. A product comprising a wrapped stream of material or wrapped stream of layers of materials deposited evenly along a tubular or profile shape, wherein the product does not include a weld line, wherein the wrapped stream of layers of materials includes of 1000-100,000 layers.

12. The product according to claim 11 wherein multiple streams of the wrapped stream of material or wrapped stream of layers of materials are spirally nested within each other.

13. The product according to claim 11 wherein the wrapped stream of layers of materials includes one or more of said layers in the micrometer thickness range.

14. The product according to claim 13 wherein multiple streams of the wrapped stream of material or wrapped stream of layers of materials are spirally nested within each other.

15. The product according to claim 11 wherein the wrapped stream of layers of materials includes one or more of said layers in the nanometer thickness range.

16. The product according to claim 15 wherein multiple streams of the wrapped stream of material or wrapped stream of layers of materials are spirally nested within each other.

\* \* \* \* \*